(12) United States Patent
Cordeiro

(10) Patent No.: US 8,885,621 B2
(45) Date of Patent: Nov. 11, 2014

(54) METHOD, APPARATUS AND SYSTEM FOR SWITCHING TRAFFIC STREAMS AMONG MULTIPLE BANDS

(75) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 713 days.

(21) Appl. No.: 12/977,268

(22) Filed: Dec. 23, 2010

(65) Prior Publication Data

US 2011/0261735 A1   Oct. 27, 2011

Related U.S. Application Data

(60) Provisional application No. 61/327,757, filed on Apr. 26, 2010.

(51) Int. Cl.
*H04W 72/00* (2009.01)
(52) U.S. Cl.
USPC ............ 370/338; 370/343; 370/462; 370/480
(58) Field of Classification Search
None
See application file for complete search history.

(56) References Cited

U.S. PATENT DOCUMENTS

| | | | |
|---|---|---|---|
| 7,801,043 B2 | 9/2010 | Ali et al. | |
| 2003/0236064 A1 | 12/2003 | Shiohara et al. | |
| 2005/0164744 A1 | 7/2005 | du Toit | |
| 2005/0195858 A1 | 9/2005 | Nishibayashi et al. | |
| 2005/0281227 A1 | 12/2005 | Vedder et al. | |
| 2006/0034219 A1 | 2/2006 | Gu et al. | |
| 2006/0251119 A1 | 11/2006 | Ramesh | |
| 2007/0104138 A1 | 5/2007 | Rudolf et al. | |
| 2007/0135162 A1 | 6/2007 | Banerjea et al. | |
| 2008/0239957 A1 | 10/2008 | Tokura et al. | |
| 2008/0320354 A1 | 12/2008 | Doppler et al. | |
| 2009/0088089 A1 | 4/2009 | Chandra et al. | |
| 2010/0046455 A1 | 2/2010 | Wentink et al. | |
| 2010/0074190 A1 | 3/2010 | Cordeiro et al. | |
| 2010/0103885 A1 | 4/2010 | Cordeiro et al. | |
| 2010/0332822 A1 | 12/2010 | Liu et al. | |
| 2011/0053521 A1 | 3/2011 | Cordeiro | |
| 2011/0065440 A1 | 3/2011 | Kakani | |
| 2012/0182954 A1 | 7/2012 | Cordeiro et al. | |

FOREIGN PATENT DOCUMENTS

| | | |
|---|---|---|
| CN | 1671136 A | 9/2005 |
| CN | 1713775 | 12/2005 |
| CN | 1813448 | 8/2006 |
| CN | 101116306 A | 1/2008 |
| CN | 101631029 A | 1/2010 |
| EP | 1610509 | 12/2005 |
| JP | 2002335201 A | 11/2002 |
| JP | 2003-244159 | 8/2003 |
| JP | 2003-244159 A | 8/2003 |

(Continued)

OTHER PUBLICATIONS

U.S. Appl. No. 12/551,614, filed Sep. 1, 2009, Cordeiro.

(Continued)

*Primary Examiner* — Alex Skripnikov
(74) *Attorney, Agent, or Firm* — Shichrur & Co.

(57) ABSTRACT

A multiband station, a system and a method of setting a traffic steam or a block acknowledgement with a second multiband station on a first frequency band and a first channel. The multiband station may send a request on a second channel and a second frequency by including a channel, a frequency band and medium access control (MAC) address information as part of the request and response exchange.

33 Claims, 3 Drawing Sheets

(56) References Cited

FOREIGN PATENT DOCUMENTS

| JP | 2006-54884 A | 2/2006 |
|---|---|---|
| JP | 2007-006327 A | 1/2007 |
| JP | 2007-532047 A | 11/2007 |
| JP | 2008167285 A | 7/2008 |
| JP | 2008538272 A | 10/2008 |
| JP | 2009-518963 A | 5/2009 |
| JP | 2009-206848 A | 9/2009 |
| JP | 2012-503944 A | 2/2012 |
| KR | 10-2007-0043346 A | 4/2007 |
| KR | 10-2007-0120022 A | 12/2007 |
| KR | 10-0819705 B1 | 3/2008 |
| WO | 2005006662 | 1/2005 |
| WO | 2005/069878 A2 | 8/2005 |
| WO | 2006/085194 A1 | 8/2006 |
| WO | 2006080749 A1 | 8/2006 |
| WO | 2006/107886 A2 | 10/2006 |
| WO | 2010/022256 A2 | 2/2010 |
| WO | 2010/036595 A2 | 4/2010 |
| WO | 2011/005567 A2 | 1/2011 |

OTHER PUBLICATIONS

U.S. Appl. No. 12/977,289, filed Dec. 23, 2010, Cordeiro et al.
U.S. Appl. No. 12/977,244, filed Dec. 23, 2010, Trainin.
International Preliminary Report on Patentability for PCT/US2011/033878 Mailed on Nov. 8, 2012; 6 pages.
International Preliminary Report on Patentability for PCT/US2011/031090 Mailed on Nov. 8, 2012; 5 pages.
International Preliminary Report on Patentability for PCT/US2011/033886 Mailed on Nov. 8, 2012; 6 pages.
IEEE Std 802.11, IEEE Standard for Information technology—Telecommunications and information exchange between systems—Local and metropolitan area networks—Specific requirements, Part 11: Wireless LAN Medium Access Control (MAC) and Physical Layer (PHY) Specifications—Jun. 2007, pp. 1-1184.
International Search Report and Written Opinion Received for PCT Application No. PCT/US2010/043846, mailed on Apr. 29, 2011, 8 pages.
Office Action from U.S. Appl. No. 12/551,614 mailed on Apr. 11, 2012; 20 pages.
International Preliminary Report on Patentability for PCT/US2010/043846 mailed on Mar. 15, 2012.
Office Action from U.S. Appl. No. 12/551,614 mailed on Oct. 18, 2012; 19 pages.
Office Action Received for Chinese Patent Application No. 201010287221.3, Mailed on Mar. 5, 2013, 11 pages Office Action including 3 pages English Translation.
Office Action Received for Japanese Patent Application No. 2011-090681, Mailed on Sep. 25, 2012, 6 pages of Office Action including 3 pages of English Translation.
Office Action Received for Japanese Patent Application No. 2011-088260, Mailed on Sep. 25, 2012, 8 pages of Office Action including 4 pages of English Translation.
Office Action received for Japanese Patent Application No. 2011-084836, Mailed on Oct. 2, 2012, 4 pages of Office Action including 2 pages of English Translation.
Office Action received for Japanese Patent Application No. 2011-088260, mailed on Feb. 26, 2013, 2 pages of Office Action including 1 page of English Translation.
Office Action for U.S. Appl. No. 13/432,066, mailed on Apr. 15, 2013, 9 pages of Office Action.
Eldad Perahia et al., "IEEE 802.11ad: Defining the Next Generation Multi-Gbps Wi-Fi", IEEE 2010, 5 pages.
International Search Report and Written Opinion received for PCT Patent Application No. PCT/US2011/031090, mailed on Nov. 22, 2011, 8 pages.
International Search Report and Written Opinion received for PCT Patent Application No. PCT/US2011/033878, mailed on Dec. 15, 2011, 9 pages.
International Search Report and Written Opinion received for PCT Patent Application No. PCT/US2011/033886, mailed on Dec. 15, 2011, 9 pages.
Office Action for U.S. Appl. No. 12/977,244, mailed on Jun. 19, 2013, 33 pages.
Office Action received for Chinese Patent Application No. 201110116563.3, Mailed on May 23, 2013, 17 pages of Office Action Including 10 page of English Translation.
Office Action for Chinese Patent Application No. 201110116529.6; mailed on Jul. 25, 2013, 23 pages, including 15 pages of English translation.
Office Action received for Chinese Patent Application No. 201110116551.0, mailed on Jun. 18, 2013, 16 pages including 9 pages of English translation.
Office Action Received for Japanese Patent Application No. 2012-527879, Mailed on May 14, 2013, 6 pages of Office Action Including 3 page of English Translation.
Cordeiro, "PHY/MAC Complete Proposal to TGad", IEEE 802.11-10/0432r2, May 18, 2010, 57 pages.
Naveen et al., "Fast Session Transfer NT", IEEE 802.11-10/0436r2, May 18, 2010, 15 pages.
Office Action for Korean Patent Application No. 10-2012-7025744, mailed on Nov. 28, 2013, 8 pages, including 4 pages of English translation.
Office Action for Korean Patent Application No. 2012-7025549, mailed on Feb. 26, 2014, 2 pages of English translation.
Office Action for Chinese Patent Application No. 201110116529.6, mailed on Mar. 11, 2014, 22 pages, including 14 pages of English translation.
Office Action for Chinese Patent Application No. 201110116551.0, mailed on Mar. 3, 2014, 8 pages, including 5 pages of English translation.
Office Action received for Chinese Patent Application No. 201010287221.3, mailed on Nov. 26, 2013, 7 pages of English Translation and 5 pages of Chinese Office Action.
Office Action received for Chinese Patent Application No. 201110116563.3, mailed on Jan. 27, 2014, 5 pages of English Translation and 4 pages of Chinese Office Action.
Office Action for Chinese Patent Application No. 201110116529.6, mailed on Jul. 14, 2014, 7 pages, including 4 pages of English translation.
Office Action for Chinese Patent Application No. 201110116551.0, mailed on Aug. 27, 2014, 16 pages, including 9 pages of English translation.

METHOD, APPARATUS AND SYSTEM FOR SWITCHING TRAFFIC STREAMS AMONG MULTIPLE BANDS

CROSS REFERENCE TO RELATED APPLICATIONS

This application claims the priority of Provisional Patent Application 61/327,757, filed on Apr. 26, 2010 (and entitled "Method System and Apparatus For Communication At Wireless Link"), which is incorporated in its entirety herein by reference.

BACKGROUND OF THE INVENTION

Wireless local area network (WLAN) and wireless personal area network (WPAN) devices that use different radios are widely used in many platforms like note-books, net-books, desktop computers, cellular telephones, mobile personal devices and the like. The WLAN and WPAN devices may include for example, Bluetooth (BT) and WLAN transceivers that operate according to the IEEE 802.11 standards. WLAN transceivers and devices are referred to herein as WiFi transceivers and/or WiFi devices. The BT and WiFi transceivers may operate on the same frequency band for example, 2.4 GHz frequency band or on different frequency bands, for example, the BT transceiver may operate at 2.4 GHz band and the WiFi transceiver may operate at 5 GHz frequency band.

Another frequency band that the WLAN and WPAN devices may use is the 60 GHz frequency band. WiFi compliant devices may use television white spaces (<1 GHz), 2.4 GHz, 5 GHz and 60 GHz frequency bands. One of the problems of switching transceivers between multiple bands is the switching of traffic streams from one frequency band e.g., 60 GHz to the other frequency band e.g., 5 GHz, 2.4 GHz or operating in parallel in many bands efficiently.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
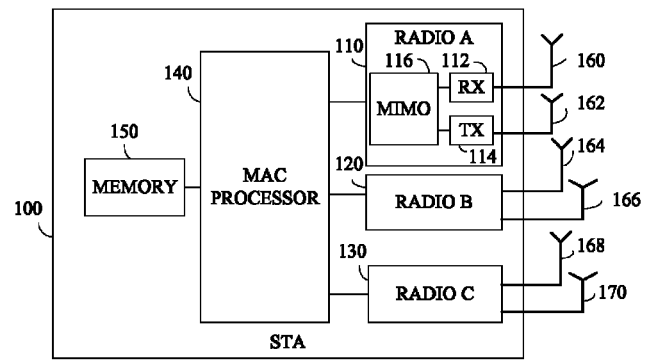
FIG. 1 is a schematic illustration of a station of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more then one. The term plurality, as used herein, is defined as two, or more than two. The term another, as used herein, is defined as, at least a second or more. The terms including and/or having, as use herein, are defined as, but not limited to, comprising. The term coupled as used herein, is defined as operably connected in any desired form for example, mechanically, electronically, digitally, directly, by software, by hardware and the like.

Furthermore, the terms "traffic" and/or "traffic stream(s)" as use herein, are defined as a data flow and/or stream between wireless devices such as stations (STA). The term session as used herein is defined as a state information kept in a pair of stations that have an established a direct physical (PHY) link (i.e., excludes forwarding). The term fast session transfer (FST) as used herein is define as the transfer of a session from a channel to another channel when the communicating STAs both have radios matching in the frequency band(s) on which they wish to communicate.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

Embodiments of the invention provide control of traffic streams before transition to another frequency band and/or channel, during the transition and after the transition is completed and the devices are active in the other frequency band and/or channel or in multiple frequency bands and/or multiple channels. Some embodiments of the present invention may include a transparent mode when the devices may have for example, the same MAC addresses in both frequency bands and/or channels. Some other embodiments of the invention may provide a non-transparent mode when at least one of the communicating devices may have different addresses in the different frequency bands and/or different channels, although the scope of the present invention is not limited to this examples.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, WPAN, and the like.

Types of WPAN and WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a personal media player (PMP), a digital video camera (DVC), a digital audio player, a speaker, an audio receiver, an audio amplifier, a data source, a data sink, a digital still camera (DSC), a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a wired or wireless network, a wireless area network, a Wireless Video Are Network (WVAN), a Local Area Network (LAN), a WLAN, a Personal Area Network (PAN), a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-1999: Wireless LAN Medium Access Control (MAC) and Physical Layer (PHY) Specifications) standards ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a personal communication systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some demonstrative embodiments may be used in conjunction with suitable limited-range or short-range wireless communication networks, for example, "piconets" or "PBSS", e.g., a wireless area network, a WVAN, a WPAN, and the like.

Turning first to FIG. 1 a schematic illustration of a station of a wireless communication network according to exemplary embodiments of the present invention is shown. According to embodiments of the present invention a station 100 may be a wireless communication device for example, an access point (AP), a piconet controller (PNC), a PBSS control point (PCP), a STA, an initiator, a Recipient or the like.

According to exemplary embodiments of the invention Station 100 may be referred to as a multiband station, if desired. Station 100 may include for example, a plurality of radios for example radio A 110, radio B 120 and radio C 130. Each of radio A 110, radio B 120 and radio C 130 is operably coupled to two or more antennas. For example radio A 110 is operably coupled to antennas 160 and 162, radio B 120 is operably coupled to antennas 164 and 166 and radio C is operably coupled to antennas 168 and 170.

According to some exemplary embodiments of the invention Radio A 110, radio B 120 and radio C 130 may have a similar architecture as is shown with respect to radio A 110. For example each radio may include at least a multiple-input-multiple-output (MIMO) controller 116 and/or beam forming controller, a receiver (RX) 112 and a transmitter (TX) 114, although the scope of the present invention is not limited in this respect.

Furthermore, according to some embodiments of the invention, each of the radios may operate on a different frequency band/channel, if desired. For example, radio A 110 may operate on a 60 GHz frequency band, radio B 120 may operate on a 5 GHz frequency band and radio C 130 may operate on 2.4 GHz frequency band, although it should be understood that embodiments of the present invention are not limited to this example.

Station 100 may further include a media access control (MAC) processor 140 and a memory 150. MAC processor 140 may operate a MAC protocol according to IEEE 802.11ad and/or IEEE 802.15.3c and or WirelessHD™ and/or ECMA-387 and/or ISO/IEC 13156:2009 and/or Bluetooth™ and/or WGA specification, if desired.

Memory 150 may include volatile memory, non-volatile memory, removable or non-removable memory, erasable or non-erasable memory, writeable or re-writeable memory, and the like. For example, memory 150 may include random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like.

Antennas 160, 162, 164 166 168 and 170 may include, for example, phase array antennas, an internal and/or external RF antenna, a dipole antenna, a monopole antenna, an omnidirectional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data, although the scope of the present invention is not limited to these examples.

STA 100 for example a multiband station may include radio A 110 and radio B 120. Radio A may operate on a first channel on a 60 GHz frequency band and radio B 120 may operate on a second channel on 2.4 MHz frequency band, if desired. Alternatively, Radio A and Radio B may operate on different channels within the same band. For example, MAC processor 140 may set, establish or create a traffic steam (TS) with a second multiband station on the 2.4 GHz frequency band and the second channel by sending a request (e.g., a request frame) on a first channel on the 60 GHz frequency band.

According to one embodiment of the invention, the request (e.g., a request frame) may include a channel number, a frequency band and a medium access control (MAC) address information, although it should be understood that the request may include other information, if desired. MAC processor 140 to receive a response (e.g., a response frame) from the second multiband station through antennas 164 and 166 with radio B which operates on the second channel for on 2.4 GHz frequency band, although the scope of the present invention is not limited to this example.

According to one embodiment, the request (e.g., a request frame) may be an add traffic stream (ADDTS) request and the response (e.g., a response frame) may be an ADDTS Response. MAC processor 140 may send the ADDTS Request frame to the second multiband station. For example, the ADDTS Request frame may include desired channel information or a reference to a channel (e.g., a number) to establish the desired TS with the second multiband STA, a reference to or information on the frequency band (e.g., a number) to establish the TS and a MAC address of the multiband station on the desired channel for example, the MAC address of radio B 120 of the requesting multiband station. MAC processor 140 may receive a response (e.g., a response frame) from the second multiband station on the requested channel and frequency band. For example, the ADDTS Response frame may include a reference to or information on the frequency band, a reference to or information on the channel and the MAC address of the requested frequency band the requesting multiband station, for example the MAC address of radio B 120 of the responding station, if desired.

According to another exemplary embodiment of the invention, the request and response frames may include add block acknowledgment (ADDBA) request and ADDBA response frames, if desired. MAC processor 140 may send the ADDBA Request frame to the second multiband station. For example, the ADDBA Request frame may include desired channel information to establish the desired TS with the second multiband STA, a reference to or information on the frequency band to establish the TS and a MAC address of the multiband station on the desired channel for example the MAC address of radio B 120 of the requesting multiband station. MAC processor 140 may receive a response from the second multiband station on the requested channel and frequency band. For example, the ADDBA response frame may include a reference to, or information on, the frequency band and a reference to, or information on the following: a channel, a MAC address of the requested frequency band of the requesting multiband station, for example the MAC address of radio B 120 of the responding station, if desired.

According to this example embodiment MAC processor 140 may send a delete block acknowledgement (DELBA) frame from the requesting multiband station on the requested channel and requested frequency band. For example, the DELBA frame may include a reference to or information on the channel of the requesting station, a reference to or information on the frequency band of the requesting station and the MAC address of the requesting multiband station at the requesting channel and requesting frequency band e.g. the MAC address of radio A 110 of the requesting station.

It should be understood that each radio e.g., radio A 110, radio B 120 and radio C 130 of the multiband station e.g., STA 100 may operate on a separate channel on a predetermined frequency band wherein the predetermined frequency band may be the same frequency band or different frequency for at least some of the radios, if desired. STA 100 may include a unique MAC address. Thus, according to embodiment of the invention, the first multiband station may include or have a first MAC address in the first frequency band a second MAC address in the second frequency band, and the second multiband station includes, comprises or has a third MAC address in the first frequency band and a fourth MAC address in the second frequency band, although the scope of the present invention is not limited in this respect.

Figure 2A:
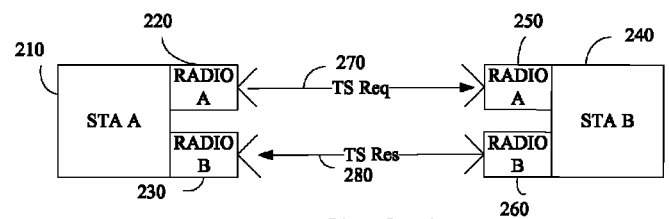
FIG. 2 is a schematic illustration of a wireless communication network according to exemplary embodiments of the present invention.
Figure 2B:
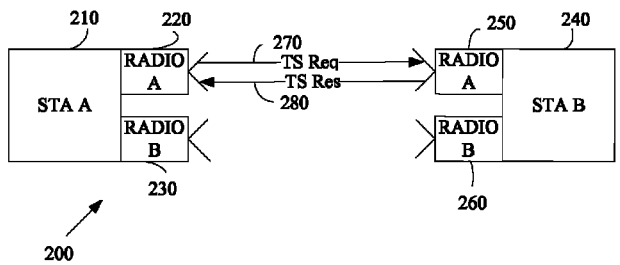

Turning to FIG. 2 a schematic illustration of a wireless communication network according to exemplary embodiments of the present invention is shown. For example, wireless communication network 200 may operate according to the standard developed by the IEEE 802 802.11 Task Group ad (TGad) and/or according to WGA industry standard and/or according to IEEE 802.15.3c standard and/or according to WirelessHD™ industry standard and/or ECMA-387 industry standard or the like.

According to exemplary embodiments of the invention, FIG. 2 shows two states of wireless network 200. State a—before setting traffic stream (TS) 280 and state b—after setting TS 270.

Although the scope of the present invention is not limited to this exemplary embodiment of the invention, wireless communication network 200 may include a station A 210 and a station B 240. Station A may include a radio A 220 and a radio B 230 and station B may include a radio A 250 and a radio B 260. STA A 210 may refer hereinafter as an Originator and STA B 220 may refer hereinafter as a Recipient, although the scope of the present invention is not limited in this respect.

According to non limited example embodiment of the invention, STA A 210 and STA B 240 architecture and components may be similar to the architecture and components of STA 100 of FIG. 1. if desired In operation, STA A 210 and STA B 220 may send a TS request 270 on a first frequency band A for example 60 GHz, and a first channel e.g., channel X, using radio A 220 of STA A 210 to radio A 250 of STA B 240, if desired. After sending TS request 270, STA A 210 and STA B 220 may operate on a second frequency band e.g., 5 GHz and a second channel e.g., Channel Y, using radio B 230 of STA A 210 and radio B 260 of STA B 240. STA B 240 may send TS response frame 280 on the second channel e.g., 5 GHz and a second band e.g., band Y, using its radio B 260. Station A 210 may receive TS response 280 by radio B 230, although the scope of the present invention is not limited in this respect.

Alternatively, STA A 210 and STA B 220 may send a TS request 270 on a first frequency band A for example 60 GHz, and a first channel e.g., channel X, using radio A 220 of STA A 210 to radio A 250 of STA B 240, if desired. After receiving the TS request 270, STA B 220 may respond with a TS response 280 to STA A 210 on channel X of the first frequency band A using radio A 250 of STA B 240 to radio A 220 of STA A 210, although the scope of the present invention is not limited in this respect.

According to another embodiment of the invention, each radio of each station may have or include its own unique MAC address. For example radio A 220 of STA A 210 may have MAC address M1 radio B 230 of STA A 210 may have MAC address M3, radio A 250 of STA B 240 may have MAC address M2 and radio B 260 of STA B 240 may have MAC address M4, although the scope of the present invention is not limited in this respect.

Other embodiment of the invention may include other combinations of frequency bands and channels. For example, transmitting and receiving a response and request frames, respectively on the same frequency band and the same channel. For example, from STA A 210 radio A 220 to STA B 240 radio A 250 on channel X, if desired.

Figures 3, 4:
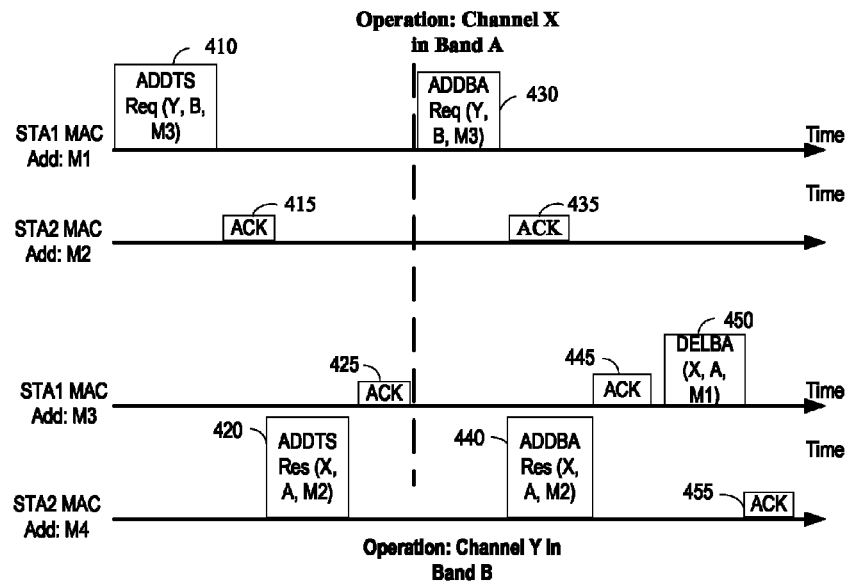
FIG. 3 is a schematic illustration of a request or response, which may be a frame, according to exemplary embodiments of the invention.
FIG. 4 is a schematic illustration of a timing diagram of traffic stream switching protocol according to some exemplary embodiments of the invention.

Turning to FIG. 3 a schematic illustration of request or response frames, according to exemplary embodiments of the invention, is shown. According to this example frame 300 may include a frequency band field 310, a channel number field 320 and a MAC address field 330.

According to embodiment of the invention fields 310, 320 and 330 may be included in ADDTS request and response frames, in ADDBA request and response frames and in DELTS and DELBA frames, although the scope of the present invention is not limited in this respect.

Turning to FIG. 4 a schematic illustration of a timing diagram of traffic stream switching protocol according to some exemplary embodiments of the invention is shown.

Although the scope of the present invention is not limited in this respect a first multiband station may set, establish and or create a traffic steam or a block acknowledgement agreement with a second multiband station on a first frequency band and a first channel by sending a request by a first multiband station on a second channel and a second frequency while communicating on the second channel and the second frequency band wherein, the request includes a information on a channel, information on a frequency band and medium access control (MAC) address information, if desired.

According to one example embodiment, a multiband station also referred to as an originator, having, for example, a MAC address M1 and a MAC address M3, operating on a desired channel e.g., channel X and a desired frequency band e.g., 60 GHz, may set, establish or create a TS with a second multiband station, also referred to as Recipient, having for example, MAC address M2 and MAC address M4, on a second channel e.g., channel Y and a second frequency band e.g., 5 GHz. The originator may send ADDTS request frame 410 to the Recipient on channel X and 60 GHz frequency band, if desired. ADDTS request frame 410 may include the desired frequency band e.g., 5 GHz, the desired channel e.g., channel Y and the MAC address of the originator on channel Y and 5 GHz frequency band, if desired.

According to this example, the recipient may send Acknowledgement (ACK) frame 415 on channel X and on the 60 GHz frequency band. In addition, the recipient may send ADDTS response frame 420 on channel Y and frequency band 5 GHz to the originator, or the recipient may send ADDTS response frame 420 on channel X and frequency band 60 GHz to the originator. ADDTS response frame 420 may include the channel and the frequency band of the originator, for example channel X and 60 GHz frequency band, and the MAC address of the recipient on the originator channel and frequency band. In response, the originator may send ACK frame 425 to the recipient on channel Y and the 5 GHz frequency band, although the scope of the present invention is not limited to this exemplary embodiment of the invention.

According to another embodiment of the invention, the originator may send ADDBA request frame 430 to the recipient on channel X and 60 GHz frequency band, if desired. ADDBA request frame 430 may include the desired frequency band e.g., 5 GHz, the desired channel e.g., channel Y and the MAC address of the originator on channel Y and 5 GHz frequency band, if desired.

According to this example, the recipient may send ACK frame 435 on channel X and on the 60 GHz frequency band. In addition, the recipient may send ADDBA response frame 440 on channel Y and frequency band 5 GHz to the originator. ADDBA response frame 440 may include the channel and the frequency band of the originator, for example channel X and 60 GHz frequency band, and the MAC address of the recipient on the originator channel and frequency band. In response, the originator may send ACK frame 445 to the recipient on channel Y and the 5 GHz frequency band.

In order to cease the BA and/or TS, the originator may send, respectively, DELBA 450 and/or DELTS frame (not shown). These frames may be transmitted on any band/channel, for example, to delete a BA established on channel X and Band A with a station of MAC address M1, a DELBA 450 may be transmitted on channel Y and 5 GHz frequency band specifying X, A and M1 450, and this is followed by ACK 455 from the Recipient. DELBA 450 and/or DELTS frames may include the initial channel and the frequency band of the originator e.g., channel X and 60 GHz frequency band and the initial MAC address e.g., M1, although the scope of the present invention is not limited to this exemplary embodiment of the invention.

Figure 5:
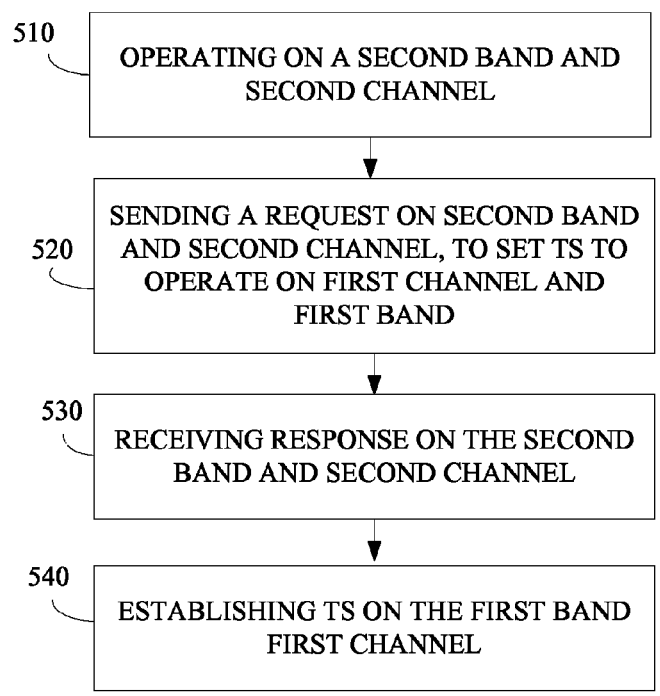
FIG. 5 is a schematic illustration of flowchart of a method of setting a traffic stream according to exemplary embodiments of the invention.

Turning to FIG. 5 a schematic illustration of flowchart of a method of setting a traffic stream according to exemplary embodiments of the invention is shown. An originator e.g., STA 210 may be in communication with a recipient e.g., STA 240 over one frequency band and one channel for example a 60 GHz frequency band and channel X (text box 510). The originator may send a request to set a TS on another channel and/or another frequency band (text box 520). For example the request may be ADDTS and/or ADDBA request and the frequency band may be 60 GHz, SGHa and/or 2.4 GHz, if desired.

According to this exemplary embodiment, the recipient may send a response e.g., ADDTS and/or ADDBA response frames as appropriate, on the same channel and frequency band where the request is received e.g., channel X and 60 GHz frequency band. The originator may receive the response on channel X and 60 GHz frequency band (text box 530) and may establish the TS on channel Y and 5 GHz frequency band (text box 540), although the scope of the present invention is not limited in this respect.

Other operations or series of operations may be used.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of managing traffic streams in a multiband wireless network, the method comprising:
    setting a traffic stream agreement with a second multiband station on a first frequency band and a first channel by sending an Add Traffic Stream (ADDTS) request by a first multiband station on a second channel and a second frequency band while communicating on the second channel and the second frequency band, wherein the ADDTS request includes information on the first channel, information on the first frequency band and a medium access control (MAC) address of the first multiband station in the first channel.

2. The method of claim 1 comprising:
    receiving a response from the second multiband station on the second channel and the second frequency band.

3. The method of claim 1 comprising:
    receiving a response from the second multiband station on the first channel and the first frequency band.

4. The method of claim 1 comprising:
    sending a delete traffic stream (DELTS) frame from the first multiband station.

5. The method of claim 1 comprising:
    receiving an ADDTS Response from the second multiband station, wherein the ADDTS Response includes information on the second channel, information on the second frequency band and a MAC address of the second multiband station in the second channel.

6. The method of claim 1, wherein the MAC address of the first multiband station on the first channel and the first frequency band comprises
    a first MAC address, and wherein the first multiband station has a second MAC address on the second channel and the second frequency band.

7. A method of managing traffic streams in a multiband wireless network, the method comprising:
    setting a block acknowledgement agreement with a second multiband station on a first frequency band and a first channel by sending an Add Block Acknowledgement (ADDBA) request by a first multiband station on a second channel and a second frequency band while communicating on the second channel and the second frequency band, wherein the ADDBA request includes information on the first channel, information on the first frequency band and a medium access control (MAC) address of the first multiband station in the first channel.

8. The method of claim 7 comprising:
    receiving an ADDBA Response from the second multiband station, wherein the ADDBA Response includes information on the second channel, information on the second frequency band and a MAC address of the second multiband station in the second channel.

9. The method of claim 7, comprising
    sending a delete block acknowledgement (DELBA) frames from the first multiband station.

10. A first multiband station comprising:
    at least a first radio and a second radio, wherein the first radio is to operate in a first channel and a first frequency band, and the second radio is to operate in a second channel and a second frequency band; and
    a medium access control (MAC) processor to set an Add Traffic Stream (ADDTS) agreement with a second multiband station on the first frequency band and the first channel by sending an ADDTS request on the second channel and the second frequency band, wherein the ADDTS Request includes information on the first channel, information on the first frequency band and a MAC address of the first multiband station in the first channel.

11. The multiband station of claim 10, wherein the MAC processor is able to receive an ADDTS Response from the second multiband station, wherein the ADDTS Response includes information on the second channel, information on the second frequency band and a MAC address of the second multiband station in the second channel.

12. A first multiband station comprising:
    at least a first radio and a second radio, wherein the first radio is to operate in a first channel and a first frequency band, and the second radio is to operate in a second channel and a second frequency band; and
    a medium access control (MAC) processor to set an Add Block Acknowledgement (ADDBA) agreement with a second multiband station on the first frequency band and the first channel by sending an ADDBA request on the second channel and the second frequency band, wherein the ADDBA Request includes information on the first channel, information on the first frequency band and a MAC address of the first multiband station in the first channel.

13. The multiband station of claim 12, wherein the MAC processor is able to receive an ADDBA Response from the second multiband station, wherein the ADDBA Response includes information on the second channel, information on the second frequency band and a MAC address of the second multiband station in the second channel.

14. A first multiband station comprising:
    at least a first radio and a second radio, wherein the first radio is to operate in a first channel and a first frequency band, and the second radio is to operate in a second channel and a second frequency band; and
    a medium access control (MAC) processor to set a traffic stream or block acknowledgement with a second multiband station on the first frequency band and the first channel by sending a request on the second channel and the second frequency band, wherein the request includes first channel information, first frequency band information and first medium access control (MAC) address information, and to receive a response from the second multiband station on the second channel and the second frequency band, wherein the response includes second channel information, second frequency band information and second medium access control (MAC) address information, wherein the MAC processor is able to send a delete frame, the delete frame including a delete block acknowledgement (DELBA) frame or delete traffic stream (DELTS) frame, from the first multiband station on the first channel and the first frequency band, wherein the delete frame includes information on the second channel, information on the second frequency band and a MAC address of the first multiband station in the second channel and the second frequency band.

15. The first multiband station of claim 14, wherein the request comprises an Add Traffic Stream (ADDTS) request or an Add Block Acknowledgement (ADDBA) request.

16. A first multiband station comprising:
at least a first radio and a second radio, wherein the first radio is to operate in a first channel and a first frequency band, and the second radio is to operate in a second channel and a second frequency band; and
a medium access control (MAC) processor to set a traffic stream or block acknowledgement with a second multiband station on the first frequency band and the first channel by sending a request on the second channel and the second frequency band, wherein the request includes first channel information, first frequency band information and first medium access control (MAC) address information, and to receive a response from the second multiband station on the second channel and the second frequency band, wherein the response includes second channel information, second frequency band information and second medium access control (MAC) address information,
wherein the first multiband station has a first MAC address in the first frequency band and the first channel, and a second MAC address in the second frequency band and the second channel, and wherein the second multiband station has a third MAC address in the first frequency band and the first channel and a fourth MAC address in the second frequency band and the second channel.

17. The first multiband station of claim 16, wherein the request comprises an Add Traffic Stream (ADDTS) request or an Add Block Acknowledgement (ADDBA) request.

18. A wireless communication system comprising:
a first multiband station including:
at least a first radio and a second radio wherein the first radio is to operate in a first channel and a first frequency band and the second radio is to operate in a second channel and a second frequency band;
a memory;
one or more antennas associated with said first and second radios; and
a medium access control (MAC) processor to set an Add Traffic Stream (ADDTS) agreement with a second multiband station on the first frequency band and the first channel by sending an ADDTS request on the second channel and the second frequency band, wherein the ADDTS Request includes information on the first channel, information on the first frequency band and a MAC address of the first multiband station in the first channel.

19. The wireless communication system of claim 18, wherein the MAC processor is able to receive an ADDTS Response from the second multiband station, wherein the ADDTS Response includes information on the second channel, information on the second frequency band and a MAC address of the second multiband station in the second channel.

20. A wireless communication system comprising:
a first multiband station including:
at least a first radio and a second radio wherein the first radio is to operate in a first channel and a first frequency band and the second radio is to operate in a second channel and a second frequency band;
a memory;
one or more antennas associated with said first and second radios; and
a medium access control (MAC) processor to set an Add Block Acknowledgement (ADDBA) agreement with a second multiband station on the first frequency band and the first channel by sending an ADDBA request on the second channel and the second frequency band, wherein the ADDBA Request includes information on the first channel, the first frequency band and a MAC address of the first multiband station in the first channel.

21. The wireless communication system of claim 20, wherein the MAC processor is able to receive an ADDBA Response from the second multiband station, wherein the ADDBA Response includes information on the second channel, information on the second frequency band and a MAC address of the second multiband station in the second channel.

22. A wireless communication system comprising:
a first multiband station including:
at least a first radio and a second radio wherein the first radio is to operate in a first channel and a first frequency band and the second radio is to operate in a second channel and a second frequency band;
a memory;
one or more antennas associated with said first and second radios; and
a medium access control (MAC) processor to set a traffic steam or block acknowledgement with a second multiband station on the first frequency band and the first channel by sending a request on the second channel and the second frequency band, wherein the request includes first channel information, first frequency band information and first medium access control (MAC) address information, and to receive a response from the second multiband station on the second channel and the second frequency band, wherein the response includes second channel information, second frequency band information and second medium access control (MAC) address information,
wherein the MAC processor is able to send a delete frame, the delete frame including a delete block acknowledgement (DELBA) frame or a delete traffic stream (DELTS) frame, from the first multiband station on the first channel and the first band, wherein the delete frame includes information on the second channel, information on the second frequency band and a MAC address of the first multiband station in the second channel and second frequency band.

23. The wireless communication system of claim 22, wherein the request comprises an Add Traffic Stream (ADDTS) request or an Add Block Acknowledgement (ADDBA) request.

24. A wireless communication system comprising:
a first multiband station including:
at least a first radio and a second radio wherein the first radio is to operate in a first channel and a first frequency band and the second radio is to operate in a second channel and a second frequency band;
a memory;
one or more antennas associated with said first and second radios; and
a medium access control (MAC) processor to set a traffic steam or block acknowledgement with a second multiband station on the first frequency band and the first channel by sending a request on the second channel and the second frequency band, wherein the request includes first channel information, first frequency band information and first medium access control (MAC) address information, and to receive a response from the second multiband station on the second channel and the second frequency band,
wherein the response includes second channel information, second frequency band information and second medium access control (MAC) address information,
wherein the first multiband station has a first MAC address in the first frequency band and the first channel, and a second MAC address in the second frequency band and the second channel, and wherein the second multiband station has a third MAC address in the first frequency band and the first channel and a fourth MAC address in the second frequency band and the second channel.

25. The wireless communication system of claim 24, wherein the request comprises an Add Traffic Stream (ADDTS) request or an Add Block Acknowledgement (ADDBA) request.

26. An article including a non-transitory storage medium having stored thereon instructions that, when executed by a machine, result in:
setting a traffic stream agreement with a second multiband station on a first frequency band and a first channel by sending an Add Traffic Stream (ADDTS) request by a first multiband station on a second channel and a second frequency band while communicating on the second channel and the second frequency band, wherein the ADDTS request includes information on the first channel, information on the first frequency band and a medium access control (MAC) address of the first multiband station in the first channel.

27. The article of claim 26, wherein the instructions result in:
receiving a response from the second multiband station on the second channel and the second frequency band.

28. The article of claim 26, wherein the instructions result in:
receiving a response from the second multiband station on the first channel and the first frequency band.

29. The article of claim 26, wherein the instructions result in:
sending a delete traffic stream (DELTS) frame from the first multiband station.

30. The article of claim 26, wherein the instructions result in:
receiving an ADDTS Response from the second multiband station, wherein the ADDTS Response includes information on the second channel, information on the second frequency band and a MAC address of the second multiband station in the second channel.

31. An article including a non-transitory storage medium having stored thereon instructions that, when executed by a machine, result in:
setting a block acknowledgement agreement with a second multiband station on a first frequency band and a first channel by sending an Add Block Acknowledgement (ADDBA) request by a first multiband station on a second channel and a second frequency band while communicating on the second channel and the second frequency band, wherein the ADDBA request includes information on the first channel, information on the first frequency band and a medium access control (MAC) address of the first multiband station in the first channel.

32. The article of claim 31, wherein the instructions result in:
receiving an ADDBA Response from the second multiband station, wherein the ADDBA Response includes information on the second channel, information on the second frequency band and a MAC address of the second multiband station in the second channel.

33. The article of claim 31, wherein the instructions result in:
sending a delete block acknowledgement (DELBA) frame from the first multiband station.

* * * * *